United States Patent
Kajita

(10) Patent No.: US 10,948,763 B2
(45) Date of Patent: Mar. 16, 2021

(54) IMAGE QUALITY IMPROVING MEMBER AND LIQUID CRYSTAL DISPLAY DEVICE

(71) Applicant: Panasonic Liquid Crystal Display Co., Ltd., Hyogo (JP)

(72) Inventor: Daisuke Kajita, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/782,750

(22) Filed: Feb. 5, 2020

(65) Prior Publication Data
US 2020/0271990 A1 Aug. 27, 2020

(30) Foreign Application Priority Data
Feb. 26, 2019 (JP) .............................. JP2019-033392

(51) Int. Cl.
*G02F 1/1335* (2006.01)
*G02F 1/13357* (2006.01)

(52) U.S. Cl.
CPC .. *G02F 1/133526* (2013.01); *G02F 1/133512* (2013.01); *G02F 1/133528* (2013.01); *G02F 1/133621* (2013.01); *G02F 2001/133541* (2013.01)

(58) Field of Classification Search
CPC ......... G02F 1/133526; G02F 1/133528; G02F 1/133512; G02F 1/133621; G02F 2001/133541
USPC .......................................................... 349/95
See application file for complete search history.

(56) References Cited

U.S. PATENT DOCUMENTS

2020/0057337 A1* 2/2020 Zhao .................... G02B 5/1814

FOREIGN PATENT DOCUMENTS

JP 2010-66437 3/2010

* cited by examiner

*Primary Examiner* — Charles S Chang
(74) *Attorney, Agent, or Firm* — Wenderoth, Lind & Ponack, L.L.P.

(57) ABSTRACT

An image quality improving member comprising: a uniaxial anisotropic optical lens having a refractive index distribution in a first direction orthogonal to an optical axis of incident light, the optical lens condensing light vibrating in the first direction in the incident light; a translucent first substrate in which a black matrix including a plurality of first openings transmitting light output from the optical lens is formed; and a first polarizing plate disposed on the first substrate, the first polarizing plate having an absorption axis in a second direction orthogonal to the first direction when viewed from a direction of the optical axis.

11 Claims, 9 Drawing Sheets

IMAGE QUALITY IMPROVING MEMBER AND LIQUID CRYSTAL DISPLAY DEVICE

CROSS-REFERENCE TO RELATED APPLICATION

This application claims priority from Japanese application JP 2019-033392, filed Feb. 26, 2019. This Japanese application is incorporated herein by reference.

1. Technical Field

The present disclosure relates to an image quality improving member and a liquid crystal display device including the image quality improving member.

2. Description of the Related Art

In a liquid crystal display device in which a liquid crystal panel is used, various investigations are made in order to improve image quality. For example, Unexamined Japanese Patent Publication No. 2010-66437 discloses a liquid crystal display device including a collimated light source, a liquid crystal layer, a phosphor layer and a light diffusion layer, and a microlens disposed between the liquid crystal layer and the phosphor layer and the light diffusion layer, the microlens collecting light from the liquid crystal layer and emitting the light to the phosphor layer and the light diffusion layer.

SUMMARY

However, in the liquid crystal display device of Unexamined Japanese Patent Publication No. 2010-66437, a contrast improving effect is small although a viewing angle characteristic is improved. For this reason, it is desirable to further improve the image quality in the liquid crystal display device.

The present disclosure has been made to solve such a problem, and an object of the present disclosure is to provide an image quality improving member and a liquid crystal display device for being able to improve the image quality.

Solution to Problem

An image quality improving member according to the present disclosure comprising: a uniaxial anisotropic optical lens having a refractive index distribution in a first direction orthogonal to an optical axis of incident light, the optical lens condensing light vibrating in the first direction in the incident light; a translucent first substrate in which a black matrix including a plurality of first openings transmitting light output from the optical lens is formed; and a first polarizing plate disposed on the first substrate, the first polarizing plate having an absorption axis in a second direction orthogonal to the first direction when viewed from a direction of the optical axis.

A liquid crystal display device according to the present disclosure comprising: a backlight that emits collimated light; a liquid crystal panel including a liquid crystal layer on which the collimated light is incident; and the image quality improving member on which the collimated light transmitted through the liquid crystal layer is incident as the incident light.

The present disclosure can provide an image quality improving member and a liquid crystal display device for being able to improve the image quality.

Figure 1:
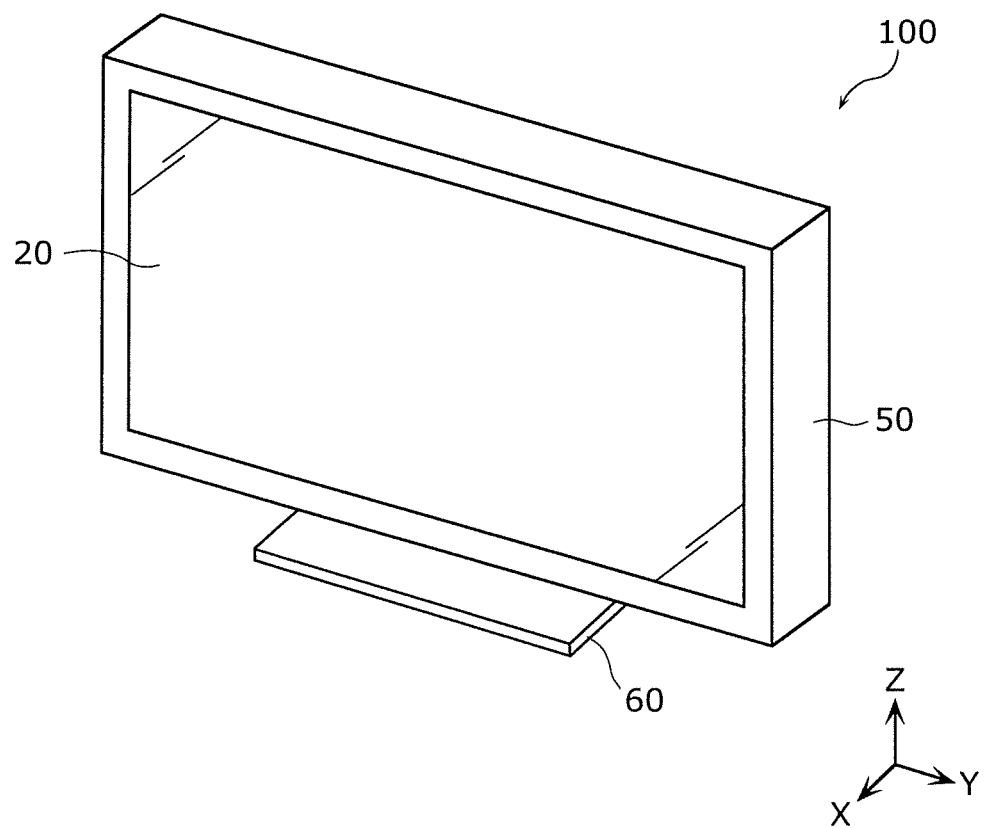
FIG. 1 is a perspective view illustrating appearance of liquid crystal display device according to the first exemplary embodiment.

Hereinafter, exemplary embodiments of the present disclosure will be described with reference to drawings. The following exemplary embodiments illustrate a preferable specific example of the present disclosure. Thus, numerical values, shapes, materials, constituent elements, arrangement positions, connection forms of the constituent components, steps and, order of steps and the like illustrated in the following exemplary embodiments are merely examples, and are not intended to limit the present disclosure. Among the constituent elements in the following exemplary embodiments, the constituent elements not described in independent claims indicating the broadest concept of the present disclosure are described as optional constituent elements.

The drawings are schematic diagrams, and not necessarily strictly illustrated. In the drawings, substantially the same configuration is designated by the same reference numerals, and overlapping description will be omitted or simplified.

In the specification and drawings, an X-axis, a Y-axis, and a Z-axis represent three axes of a three-dimensional orthogonal coordinate system, and the X-axis and the Y-axis are orthogonal to each other, and are orthogonal to the Z-axis. For convenience, a front-back direction is matched with an X-axis direction, a left-right direction is matched with a Y-axis direction, an up-down direction is matched with a Z-axis direction, and a gravity direction (down direction) is matched the negative Z-axis direction. However, this correspondence does not limit a posture during manufacturing or use of the liquid crystal display device according to the present disclosure. For example, in the following embodiments, "planar view" means viewing from the X-axis direction. The X-axis is a direction parallel to an optical axis of the incident light on the image quality improving member, and "planar view" can be said to be viewed from the direction of the optical axis. For example, in the following embodiments, "sectional view" means that a sectional surface in which the liquid crystal display device is cut along a surface parallel to an XY-plane is viewed from the Z-axis direction.

In the specification, the term, such as equal and parallel, which indicates a relationship between elements, the term, such as rectangular, which indicates a shape of the element, a numerical value, and a numerical range are not expression of only a strict meaning, but expression of a meaning including a substantially equivalent range, for example, a difference of about several percent.

FIRST EXEMPLARY EMBODIMENT

[1-1. Configuration of Liquid Crystal Display Device]

Figure 2:
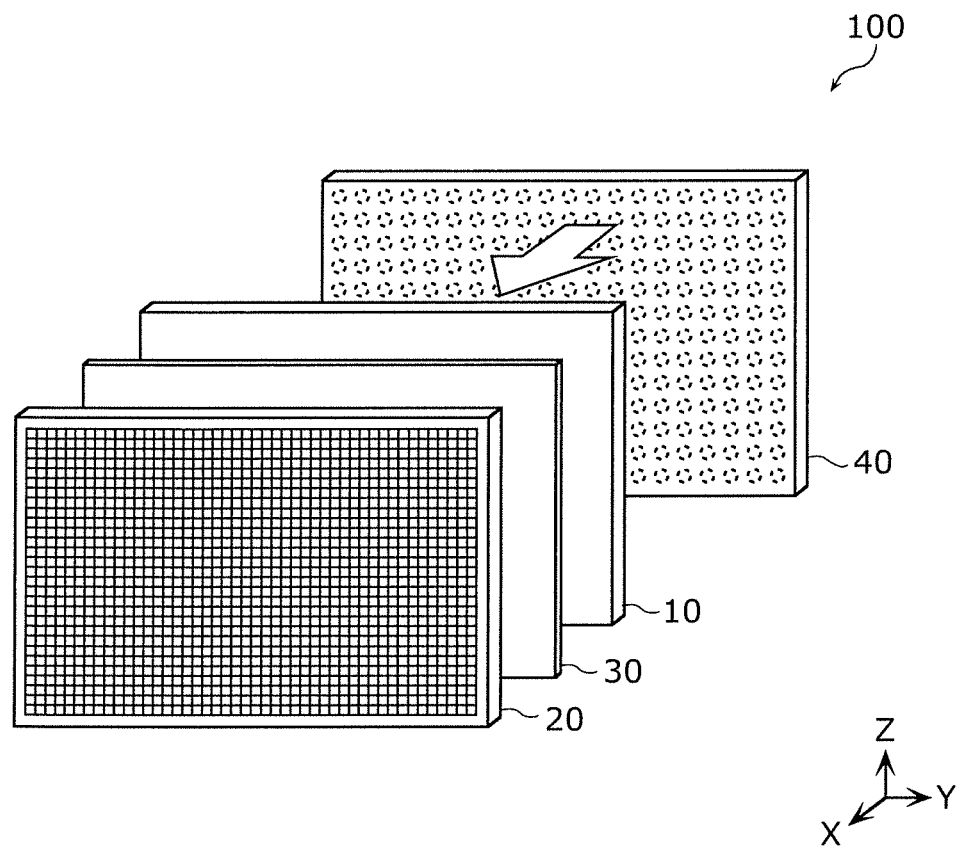
FIG. 2 is an exploded perspective view illustrating the schematic configuration of liquid crystal display device according to the first exemplary embodiment.
Figure 3:
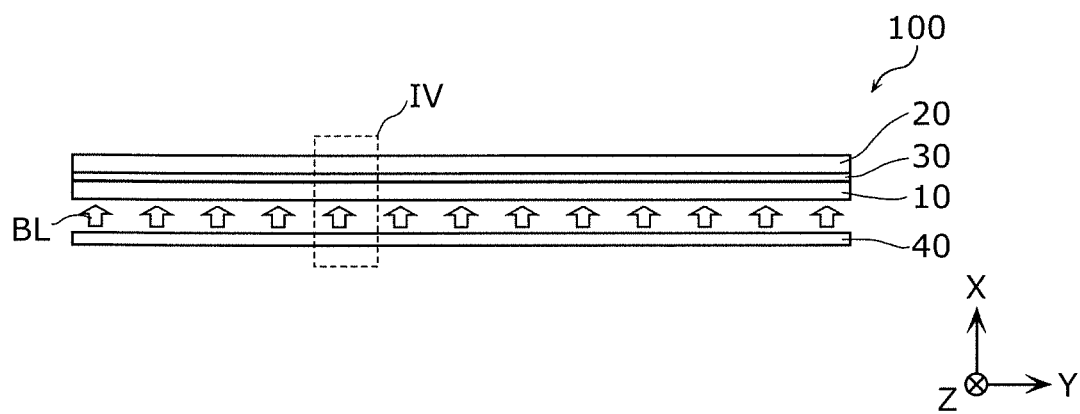
FIG. 3 is a view schematically illustrating a sectional configuration of liquid crystal display device according to the first exemplary embodiment.

A schematic configuration of a liquid crystal display device according to a first exemplary embodiment will be described below with reference to FIGS. 1 to 3. FIG. 1 is a perspective view illustrating appearance of liquid crystal display device 100 of the first exemplary embodiment; FIG. 2 is an exploded perspective view illustrating the schematic configuration of liquid crystal display device 100 of the first exemplary embodiment. FIG. 3 is a view schematically illustrating a sectional configuration of liquid crystal display device 100 of the first exemplary embodiment. In FIGS. 2 and 3, only liquid crystal panel 10, image quality improving member 20, adhesive layer 30, and backlight 40 are illustrated among components included in liquid crystal display device 100. Arrows in FIGS. 2 and 3 schematically indicate light emitted from backlight 40.

As illustrated in FIGS. 1 to 3, liquid crystal display device 100 of the first exemplary embodiment is an example of an image display device that displays an image (video) such as a still image and a moving image, and liquid crystal display device 100 includes liquid crystal panel 10, image quality improving member 20, adhesive layer 30, backlight 40, casing 50, and stand 60. As illustrated in FIGS. 2 and 3, the image quality improving member 20, the liquid crystal panel 10, and the backlight 40 are disposed in this order in liquid crystal display device 100.

Liquid crystal panel 10 displays the image visually recognized by a user. In the first exemplary embodiment, liquid crystal panel 10 displays a color image. Liquid crystal panel 10 includes a plurality of pixels arranged in a matrix as an image display region where the image is displayed. For example, a system that drives liquid crystal panel 10 is a twisted nematic (TN) system. Alternatively, the system may be an in-plane switching (IPS) system or a vertical alignment (VA) system. An example in which liquid crystal panel 10 is the TN system will be described below. An example of a system called "normally black" that is in a light shielding state when voltage is not applied will be described as liquid crystal panel 10. Alternatively, a system called "normally white" that is in a transmission state when the voltage is not applied may be used as liquid crystal panel 10.

Liquid crystal panel 10 transmits the collimated light emitted from backlight 40.

Image quality improving member 20 is a member that improves image quality of an image displayed on liquid crystal display device 100. Collimated light output from liquid crystal panel 10 (for example, collimated light transmitted through liquid crystal layer 12 (to be described later)) is incident on image quality improving member 20. Image quality improving member 20 improves the image quality by controlling a degree of condensation of the collimated light according to a polarization direction of the collimated light.

Image quality improving member 20 is a plate-shaped or film-shaped member that is disposed so as to cover liquid crystal panel 10. Details of image quality improving member 20 will be described later.

Adhesive layer 30 is disposed between liquid crystal panel 10 and image quality improving member 20, and is an adhesive member bonding liquid crystal panel 10 and image quality improving member 20 together. Adhesive layer 30 is disposed so as to fill a space between liquid crystal panel 10 and image quality improving member 20. Adhesive layer 30 transmits the collimated light output from liquid crystal panel 10 without diffusing the collimated light. Adhesive layer 30 is an adhesive such as an optical clear adhesive (OCA). A thickness of adhesive layer 30 is not particularly limited.

Backlight 40 emits the light toward liquid crystal panel 10. In the first exemplary embodiment, backlight 40 emits desired collimated light BL toward liquid crystal panel 10. For example, backlight 40 includes a light source unit and a light condensing element (for example, a collimator lens) that collimates light emitted from the light source unit. In this case, any appropriate light condensing element capable of collimating light emitted from a light source can be used as the light condensing element. The light condensing element may be omitted when the light source itself emits the collimated light.

As used herein, the collimated light is a concept including substantially parallel light (for example, slightly condensed light and slightly divergent light) in addition to perfect parallel light. That is, the term of the collimation means that the light from the light source unit is guided to image quality improving member 20 by the light condensing element, and the collimation is not limited to collimation toward infinity.

Backlight 40 is disposed on a back surface side (for example, a negative side of the X-axis) of liquid crystal panel 10. In other words, for example, backlight 40 is a light emitting diode (LED) backlight in which an LED is used as a light emitter. However, backlight 40 is not limited to the LED backlight. Backlight 40 may be a direct type or an edge type.

Casing 50 is a holding member holding liquid crystal panel 10, image quality improving member 20, backlight 40, and the like. Casing 50 covers a portion except for a front surface of image quality improving member 20. For example, casing 50 is made of resin such as polycarbonate and polystyrene or metal such as an aluminum alloy.

Stand 60 is a holding member holding casing 50 in which each component is accommodated.

Figure 4:
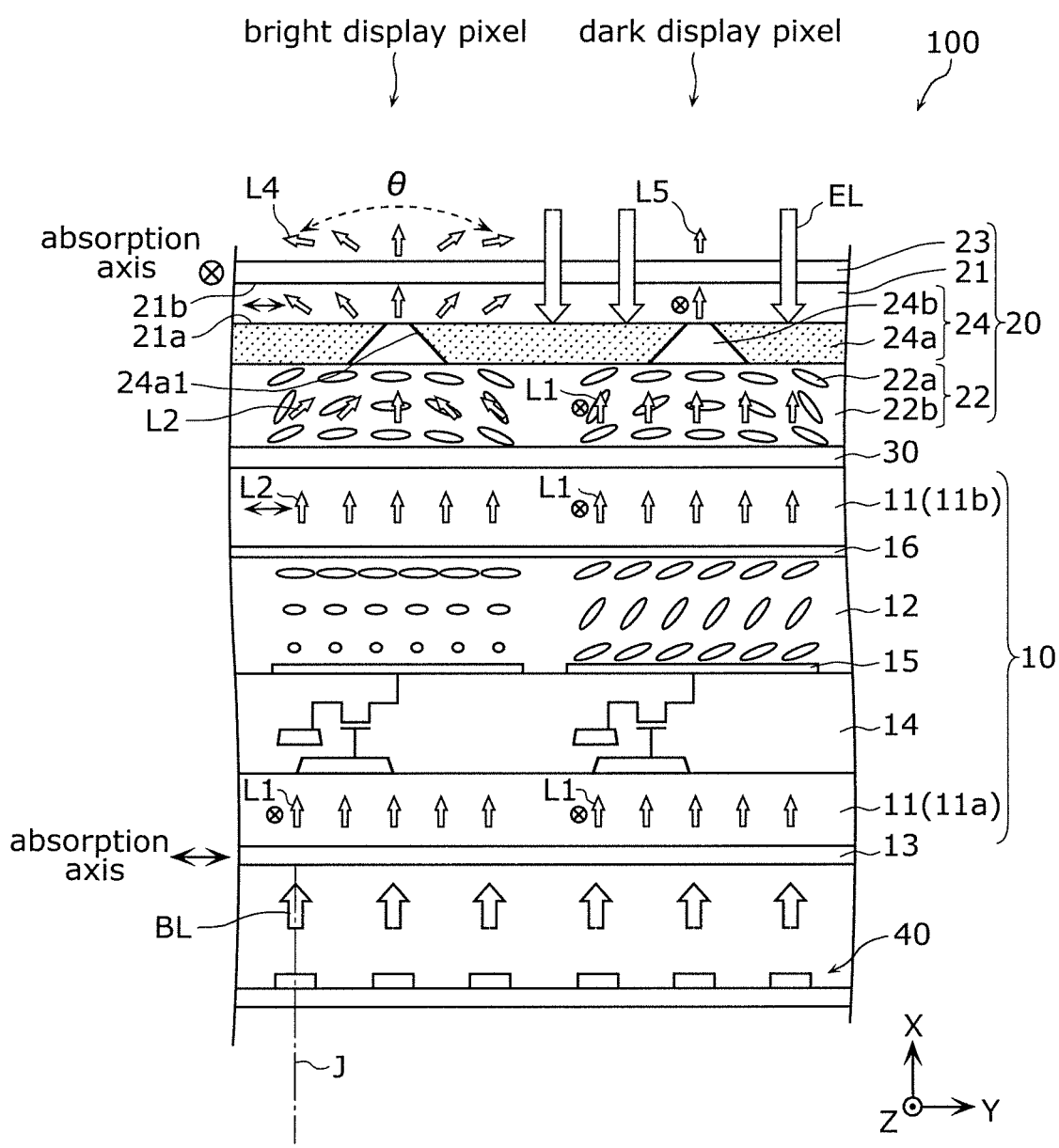
FIG. 4 is an enlarged sectional view schematically illustrating the sectional configuration of liquid crystal display device according to the first exemplary embodiment.

The configuration of liquid crystal display device 100 will be described in detail with reference to FIGS. 4 and 5. FIG. 4 is an enlarged sectional view schematically illustrating the sectional configuration of liquid crystal display device 100 of the first exemplary embodiment. FIG. 4 illustrates region IV surrounded by a broken line in FIG. 2 in an enlarged manner.

Liquid crystal panel 10 will be described first. As illustrated in FIG. 4, liquid crystal panel 10 includes a pair of second transparent substrates 11, liquid crystal layer 12, and a second polarizing plate 13. In FIG. 4, hatching is omitted for convenience. The same applies to the subsequent sectional views.

For example, each of the pair of second transparent substrates 11 is a glass substrate, and second transparent substrates 11 are disposed opposite to each other. In the first exemplary embodiment, second transparent substrate 11 located on the side of backlight 40 in the pair of second transparent substrates 11 is a thin film transistor (TFT) substrate 11a that is a TFT substrate on which a TFT and the like are formed, and second transparent substrate 11 located on the side opposite to backlight 40 in the pair of second transparent substrates 11 is counter substrate 11b.

TFT layer 14 on which the TFT or a wiring is provided is formed on a surface on the side of liquid crystal layer 12 of TFT substrate 11a. A pixel electrode 15 used to apply an electric field to liquid crystal layer 12 is formed on a planarization layer of TFT layer 14. TFT substrate 11a is an example of the second substrate having the translucency.

Counter electrode 16 is formed on the surface on the side of liquid crystal layer 12 of counter substrate 11b. The TFT, the pixel electrode, the counter electrode, and the like are formed in each pixel. An alignment film (not shown) is formed so as to cover the pixel electrode and the counter electrode.

Liquid crystal layer 12 is sealed between the pair of second transparent substrates 11. Specifically, liquid crystal layer 12 is sealed between the alignment film formed on TFT substrate 11a and the alignment film formed on counter substrate 11b. A liquid crystal material for liquid crystal layer 12 can appropriately be selected according to the driving system. The collimated light emitted from backlight 40 is incident on liquid crystal layer 12.

Second polarizing plate 13 is a sheet-shaped polarizing film made of a resin material, and is bonded to an outer surface (surface on the side opposite to liquid crystal layer 12) of TFT substrate 11a. In the first exemplary embodiment, an absorption axis of the second polarizing plate 13 is a direction parallel to the Y-axis direction.

Image quality improving member 20 will be described below. Image quality improving member 20 includes first transparent substrate 21, liquid crystal lens 22, and first polarizing plate 23.

First transparent substrate 21 is, for example, a glass substrate, and is a color filter substrate (CF substrate) on which color filter 24b is formed. Pixel formation layer 24 including black matrix 24a and color filter 24b is formed on first main surface 21a on the side of liquid crystal panel 10 of first transparent substrate 21. First main surface 21a is a surface corresponding to liquid crystal lens 22.

Second polarizing plate 23 is disposed on second main surface 21b on the side opposite to first main surface 21a of first transparent substrate 21. First transparent substrate 21 is an example of the first substrate having the translucency.

The disposition of pixel formation layer 24 (for example, black matrix 24a) and second polarizing plate 23 with respect to first transparent substrate 21 is not limited to the first exemplary embodiment. First transparent substrate 21 only needs to include pixel formation layer 24 and second polarizing plate 23. For example, pixel formation layer 24 and second polarizing plate 23 may be disposed on one of the main surfaces of first transparent substrate 21. For example, the light transmitted through liquid crystal lens 22 is earlier transmitted through pixel formation layer 24 than second polarizing plate 23.

Pixel formation layer 24 is disposed between first transparent substrate 21 and liquid crystal lens 22. That is, black matrix 24a and color filter 24b are disposed between first transparent substrates 21 and liquid crystal lens 22.

A plurality of openings 24a1 having a matrix form and constituting the pixels are formed in black matrix 24a. That is, each of the plurality of openings 24a1 corresponds to a corresponding one of the plurality of pixels. For example, black matrix 24a is formed into a lattice shape such that each opening 24a1 has a rectangular shape in planar view. The shape of each opening 24a1 in sectional view is a trapezoidal shape in which an opening width decreases as it goes from liquid crystal lens 22 toward first transparent substrate 21. That is, an opening area of opening 24a1 is reduced as it goes from liquid crystal lens 22 toward first transparent substrate 21. The opening 24a1 is an example of the first opening.

As described above, black matrix 24a including the plurality of openings 24a1 transmitting the light output from liquid crystal lens 22 is disposed on first main surface 21a of first transparent substrate 21.

In planar view, the area of the opening 24a1 is smaller than or equal to the area of black matrix 24a. An aperture ratio of black matrix 24a is less than or equal to 50%, for example, is less than or equal to 30%. From the viewpoint of reducing an influence of external light EL, the aperture ratio may be low, for example, is less than or equal to 20%. The aperture ratio is expressed as a ratio of the areas of black matrix 24a and opening 24a1 and the area of opening 24a1 in planar view of black matrix 24a. External light EL is the light incident on image quality improving member 20 in addition to the light from backlight 40. For example, external light EL is the light incident from the surface on the side of first polarizing plate 23 of image quality improving member 20. For example, external light EL is sunlight or illumination light.

Color filter 24b is formed in opening 24a1 of black matrix 24a. For example, color filter 24b includes a red color filter (an example of the first color filter), a green color filter (an example of the second color filter), and a blue color filter (an example of the third color filter). Each color filter constitutes a subpixel.

Color filter 24b may not be provided when liquid crystal display device 100 is a display device that displays a monochrome image. In this case, in pixel formation layer 24, a translucent resin may be disposed in each opening 24a1. When the color filter is provided at another location, for example, when the color filter is provided on counter substrate 11b of liquid crystal panel 10, the pixel formation layer 24 may not include color filter 24b.

Liquid crystal lens 22 has a function of condensing predetermined light incident from liquid crystal panel 10. That is, liquid crystal lens 22 has a function similar to a convex lens. The disposition position and the sectional shape of each opening 24a1 are appropriately determined according to a focal length of liquid crystal lens 22 and the like. The predetermined light means the light vibrating in a direction parallel to a distribution direction of liquid crystal lens 22, for example, the light vibrating in a direction orthogonal to the absorption axis of first polarizing plate 23. The distribution direction means a direction (the Y-axis direction, an example of the first direction) orthogonal to optical axis J of collimated light BL (an example of the incident light).

Specifically, liquid crystal lens 22 is a uniaxial anisotropic optical lens that collects and outputs the light vibrating in the direction parallel to the distribution direction. Liquid crystal lens 22 includes liquid crystal molecules 22a and resin layer 22b in which liquid crystal molecules 22a are dispersed. Liquid crystal molecules 22a are fixed in resin layer 22b in a predetermined alignment state. That is, liquid crystal lens 22 cannot dynamically control the alignment state of liquid crystal molecules 22a according to the voltage. Resin layer 22b is formed of a thermosetting resin material or a photocurable resin material.

For example, liquid crystal molecules 22a are a liquid crystal material having a positive dielectric anisotropy. Liquid crystal molecules 22a have refractive index anisotropy (birefringence). That is, refractive index ne for the light vibrating parallel to the optical axis is different from refractive index no for the light vibrating perpendicular to the optical axis. Liquid crystal molecules 22a may be liquid crystal molecules having a large value of Δn=ne−no. As an example, ne is 1.6 and no is 1.5. However, liquid crystal molecules 22a is not limited to the example. Resin layer 22b is made of a thermosetting or photocurable resin material having the translucency.

As described above, liquid crystal lens 22 of the first exemplary embodiment includes liquid crystal molecules 22a having the refractive index anisotropy, and the arrangement of liquid crystal molecules 22a is fixed. That is, liquid crystal lens 22 always has a GRIN (Gradient Index) lens structure regardless of an external stimulus (for example, the voltage). Image quality improving member 20 does not include an electrode or the like that dynamically controls the alignment direction of liquid crystal molecules 22a by applying the electric field to liquid crystal lens 22.

The refractive index of liquid crystal lens 22 changes according to a change in the alignment direction of liquid crystal molecules 22a. For this reason, liquid crystal lens 22 has a refractive index distribution in a direction (distribution direction) orthogonal to optical axis J of collimated light BL. As the long side direction of liquid crystal molecules 22a is disposed horizontally to the X-axis, the refractive index of liquid crystal lens 22 decreases at that position. As the long side direction is disposed horizontally to the Y-axis, the refractive index of liquid crystal lens 22 increases at that position.

The refractive index distribution of liquid crystal lens 22 will be described below with reference to FIG. 5. FIG. 5 is a view illustrating the refractive index distribution in liquid crystal lens 22 of the first exemplary embodiment.

Figure 5:
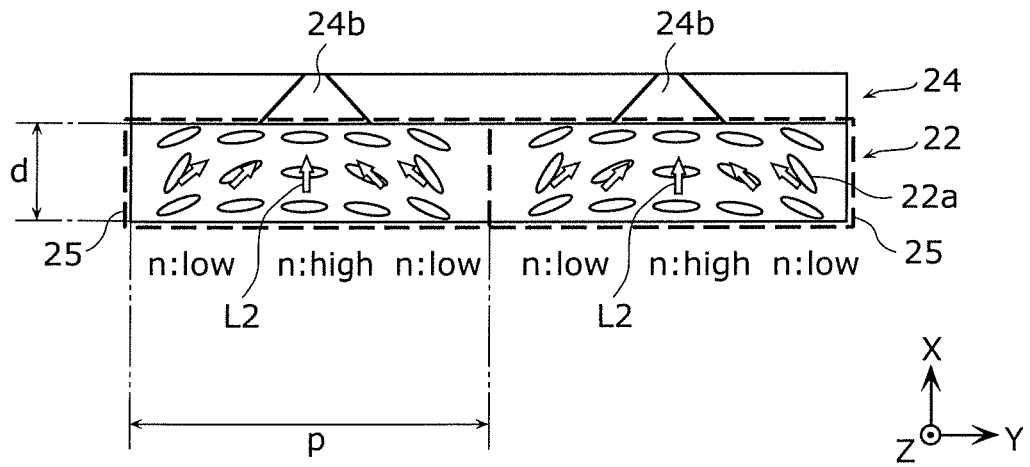
FIG. 5 is a view illustrating the refractive index distribution in liquid crystal lens according to the first exemplary embodiment.

As illustrated in FIG. 5, color filter 24b located on the left side of FIG. 5 will be described as an example. In the alignment state of liquid crystal molecules 22a, refractive index n becomes from low to high state in the direction from the positive Y-axis side to the negative Y-axis side, and returns to the low state. Collimated light L2 in the distribution direction incident on the portion having the low refractive index is condensed by liquid crystal lens 22 because an optical path is bent in the direction having the high refractive index.

When the portion where liquid crystal molecules 22a are aligned to condense the light onto one color filter 24b (or opening 24a1) is set to lens unit 25 of liquid crystal lens 22, liquid crystal lens 22 includes lens unit 25 in each color filter 24b (or opening 24a1). Color filter 24b (or opening 24a1) and lens unit 25 are provided on a one-to-one basis. Consequently, when light polarized in the Y-axis direction is incident on lens unit 25, the light can be condensed toward color filter 24b corresponding to lens unit 25.

Thus, liquid crystal lens 22 can condense the light incident on liquid crystal lens 22 by the refractive index distribution. That is, liquid crystal lens 22 is a gradient index lens (GRIN lens), and does not obtain a lens effect by a lens shape unlike a convex lens.

In sectional view, a length on the side of liquid crystal lens 22 of opening 24a1 is smaller than a length of lens unit 25. Opening 24a1 is formed such that the opening area gradually decreases from liquid crystal lens 22 toward first transparent substrate 21. In planar view, the area of the opening surface on the side of liquid crystal lens 22 of opening 24a1 is smaller than the area of lens unit 25. In planar view, opening 24a1 and lens unit 25 are disposed such that centers of opening 24a1 and lens unit 25 overlap each other in planar view. The shape of opening 24a1 is not limited to the above, but any shape that can transmit the condensed light may be used.

Thickness d of each lens unit is appropriately determined depending on pitch p of the lens unit, a focal length, the refractive indexes ne and no, and the like. For example, thickness d of each lens unit may be equal. For example, thickness d of each lens unit is several micrometers to hundreds micrometers.

Referring to FIG. 4, first polarizing plate 23 is a sheet-shaped polarizing film made of a resin material, and is bonded to the outer surface (the surface on the side opposite to liquid crystal lens 22) of first transparent substrate 21. In the first exemplary embodiment, the absorption axis of first polarizing plate 23 is a direction parallel to the Z-axis direction. For example, the absorption axis of first polarizing plate 23 is a direction (an example of the second direction) orthogonal to the distribution direction of liquid crystal lens 22 in planar view when viewed from optical axis J.

First polarizing plate 23 and second polarizing plate 13 are disposed such that the polarization directions of first polarizing plate 23 and second polarizing plate 13 are orthogonal to each other. That is, second polarizing plate 13 and first polarizing plate 23 are disposed in a crossed Nicol state. In this case, for example, the absorption axis of second polarizing plate 13 is a direction parallel to the distribution direction of liquid crystal lens 22 in planar view.

From the viewpoint of preventing an influence of wavelength dispersion of liquid crystal molecules 22a in liquid crystal lens 22 on the image, preferably backlight 40 includes an RGB type LED or laser, and is controlled such that each color can independently be emitted. For example, preferably backlight 40 independently emits red light (an example of the first light), green light (an example of the second light), and blue light (an example of the third light). That is, preferably backlight 40 can emit narrowband light. For example, the narrow band means a spread of the wavelength in which a half-value width with respect to the center wavelength is the center wavelength of about ±30 nm.

The light incident on the liquid crystal lens does not have the spread of the wavelength, so that the influence of the wavelength dispersion of liquid crystal molecules 22a on the display can be reduced.

In the above description, by way of example, image quality improving member 20 is configured by directly laminating first polarizing plate 23, first transparent substrate 21, pixel formation layer 24, and liquid crystal lens 22 in this order. However, the present disclosure is not limited to this configuration. Image quality improving member 20 may include another component (for example, a phase difference plate) between the components.

[1-2. Mechanism Improving Image Quality]

A mechanism in which the image quality is improved by image quality improving member 20 will be described below with reference to FIG. 4. FIG. 4 illustrates an example in which, in two pixels, the left pixel on the paper is a bright display pixel that performs bright display while the right pixel on the paper is a dark display pixel that performs dark display. The description will be made using the bright display pixel and the dark display pixel. The bright display pixel and the dark display pixel are different from each other in the alignment state of the liquid crystal in liquid crystal layer 12. The bright display means display with brightness higher than or equal to a predetermined level, and the dark display means display with brightness lower than the predetermined level. For example, the dark display may be black display.

The bright display pixel will be described first. As illustrated in FIG. 4, collimated light BL emitted from backlight 40 is incident on second polarizing plate 13. Because the absorption axis of second polarizing plate 13 is parallel to the Y-axis direction, the light (linearly polarized light) in the direction (Z-axis direction) orthogonal to the Y-axis direction is transmitted through second polarizing plate 13. Collimated light L1 transmitted through second polarizing plate 13 is twisted by 90° using liquid crystal layer 12.

Collimated light L2 (linearly polarized light in the Y-axis direction) twisted by 90° using liquid crystal layer 12 is incident on liquid crystal lens 22. Collimated light L2 is the light transmitted through liquid crystal layer 12 in a normal direction (X-axis direction) to liquid crystal layer 12. At this point, the vibration direction of collimated light L2 and the distribution direction having the refractive index distribution of liquid crystal lens 22 are parallel to each other, and are the direction parallel to the Y-axis in the example of FIG. 4. Collimated light L2 is an example of the light incident on image quality improving member 20. The optical axis of collimated light L2 is the direction parallel to optical axis J of collimated light BL emitted from backlight 40.

When collimated light L2 vibrating in the distribution direction is incident on liquid crystal lens 22, collimated light L2 is condensed by the lens effect. Condensed collimated light L2 is transmitted through first transparent substrate 21 and first polarizing plate 23, and output from liquid crystal display device 100.

Collimated light L2 transmitted through liquid crystal layer 12 in the normal direction is output in each direction by action of liquid crystal lens 22. That is, output light L4 output from liquid crystal display device 100 is the light transmitted through liquid crystal layer 12 in the normal direction. Thus, the light (hereinafter, also referred to as front output light) output from liquid crystal display device 100 in the normal direction and the output light (hereinafter, also referred to as obliquely output light) output in the direction intersecting the normal direction are equal to each other in the color and the luminance. For this reason, liquid crystal display device 100 can display images having the same color and luminance when viewed from the front and oblique directions.

For example, when the backlight is a light source that emits diffused light, the front output light is mainly formed by the light transmitted through the liquid crystal layer of the liquid crystal display device in the normal direction, and the obliquely output light is mainly formed by the light transmitted through the liquid crystal layer in the direction intersecting with the normal direction. That is, the front output light and the obliquely output light are formed by the light transmitted through the liquid crystal layer in the different directions. Consequently, differences in the color and luminance of the output light due to the direction (for example, an incident angle of the light with respect to the optical axis of the liquid crystal molecules) in which the light is transmitted through the liquid crystal layer are generated. Thus, the front output light and the obliquely output light of the liquid crystal display device are different from each other in the color and the luminance. For this reason, the liquid crystal display device cannot display the images having the same color and luminance when viewed from the front and oblique directions.

On the other hand, when liquid crystal display device 100 includes image quality improving member 20, the color and luminance of the output light output in each direction are equalized by the lens effect of liquid crystal lens 22 in performing the bright display, so that the viewing angle performance of liquid crystal display device 100 can be improved.

The dark display pixel will be described below. As illustrated in FIG. 4, collimated light L1 transmitted through second polarizing plate 13 is the same light as the case of the bright display pixel. Collimated light L1 is not twisted by liquid crystal layer 12. That is, the state of collimated light L1 does not change before and after collimated light L1 passes through liquid crystal layer 12. This is because when the voltage is applied to liquid crystal layer 12, liquid crystal molecules 22a stand up, and the long side direction of liquid crystal molecules 22a becomes nearly parallel to the normal direction.

Collimated light L1 that is not twisted by liquid crystal layer 12 is incident on liquid crystal lens 22. Collimated light L1 is the light transmitted through liquid crystal layer 12 in the normal direction (X-axis direction). At this point, the vibration direction of collimated light L1 and the distribution direction having the refractive index distribution of liquid crystal lens 22 are orthogonal to each other. Collimated light L1 is an example of the incident light incident on image quality improving member 20. The optical axis of collimated light L1 is the direction parallel to optical axis J of collimated light BL emitted from backlight 40.

Because liquid crystal lens 22 is an optical lens having the uniaxial anisotropy, the lens effect is not generated even if collimated light L1 vibrating in the direction orthogonal to the distribution direction is incident on liquid crystal lens 22. That is, because collimated light L1 is not affected by liquid crystal lens 22, collimated light L1 is not condensed. Most of collimated light L1 that is not condensed is absorbed by black matrix 24a. The vibration direction of collimated light L1 that is not condensed but transmitted through opening 24a1 is parallel to the absorption axis of first polarizing plate 23, so that most of collimated light L1 is absorbed by first polarizing plate 23. Thus, output light L5 output from the pixel that performs the dark display can effectively be prevented. For example, output light L5 in the direction intersecting with the normal direction can particularly effectively be prevented.

For example, when the liquid crystal display device includes the backlight that emits the collimated light and a microlens array that condenses the light instead of the liquid crystal lens, the collimated light transmitted through liquid crystal layer (for example, collimated light L1 transmitted through liquid crystal layer 12 in FIG. 4) is condensed by the microlens array. In such a liquid crystal display device, even for the dark display pixel, the output light is output from the liquid crystal display device in the front and oblique directions. That is, the output light in the direction intersecting with the normal direction cannot be prevented. Thus, even if the liquid crystal display device including the microlens array performs the dark display, a contrast ratio in the oblique direction is hardly improved because the obliquely output light cannot be prevented due to the generation of the lens effect of the microlens array.

On the other hand, liquid crystal display device 100 includes image quality improving member 20 including uniaxial anisotropic liquid crystal lens 22, so that the obliquely output light can be prevented because the lens effect of liquid crystal lens 22 is not generated in performing the dark display. That is, the contrast ratio in the oblique direction can be improved. Furthermore, in image quality improving member 20, black matrix 24a absorbs most of collimated light L1 transmitted through liquid crystal lens 22 in the direction parallel to the normal direction, so that the front output light can be prevented. Thus, the front contrast ratio can be improved.

As described above, liquid crystal display device 100 includes image quality improving member 20 including black matrix 24a having the low aperture ratio, the lens effect of the liquid crystal lens 22 being not generated in performing dark display. As a result, both the front output light and the obliquely output light are prevented, so that the contrast ratios in the front and oblique directions of liquid crystal display device 100 can be improved. In particular, the contrast ratio in the oblique direction can be improved.

For example, when the aperture ratio of black matrix 24a is set less than or equal to 30%, external light EL transmitted through first polarizing plate 23 can effectively be absorbed by black matrix 24a. Thus, visibility can be improved when liquid crystal display device 100 is used outdoors or in a bright room.

[1-3. Image Quality Improving Member Manufacturing Method]

Figure 6:
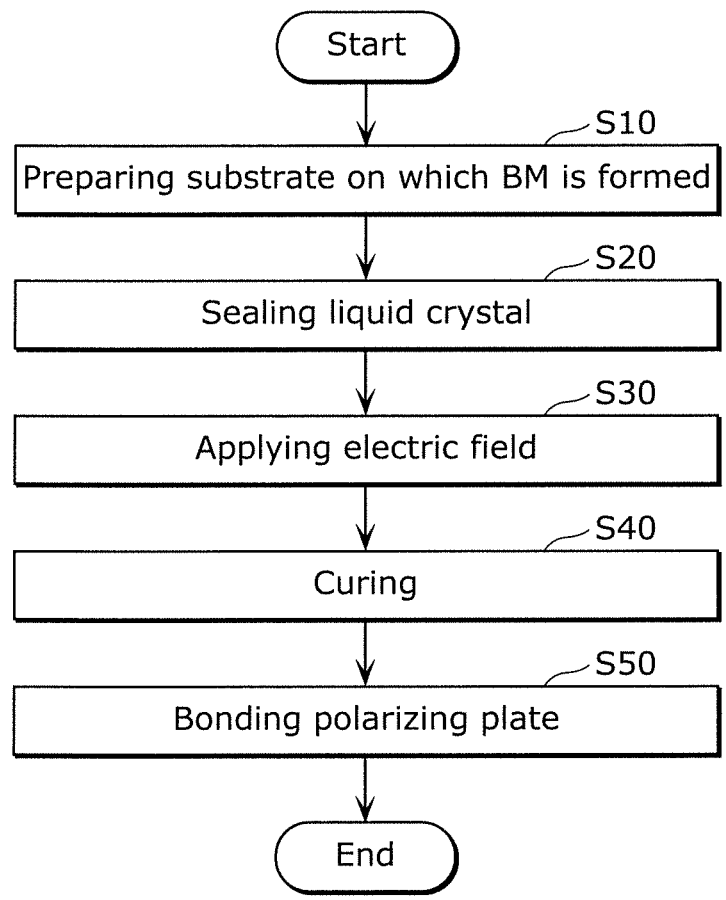
FIG. 6 is a flowchart manufacturing image quality improving member according to the first exemplary embodiment.
Figure 7:
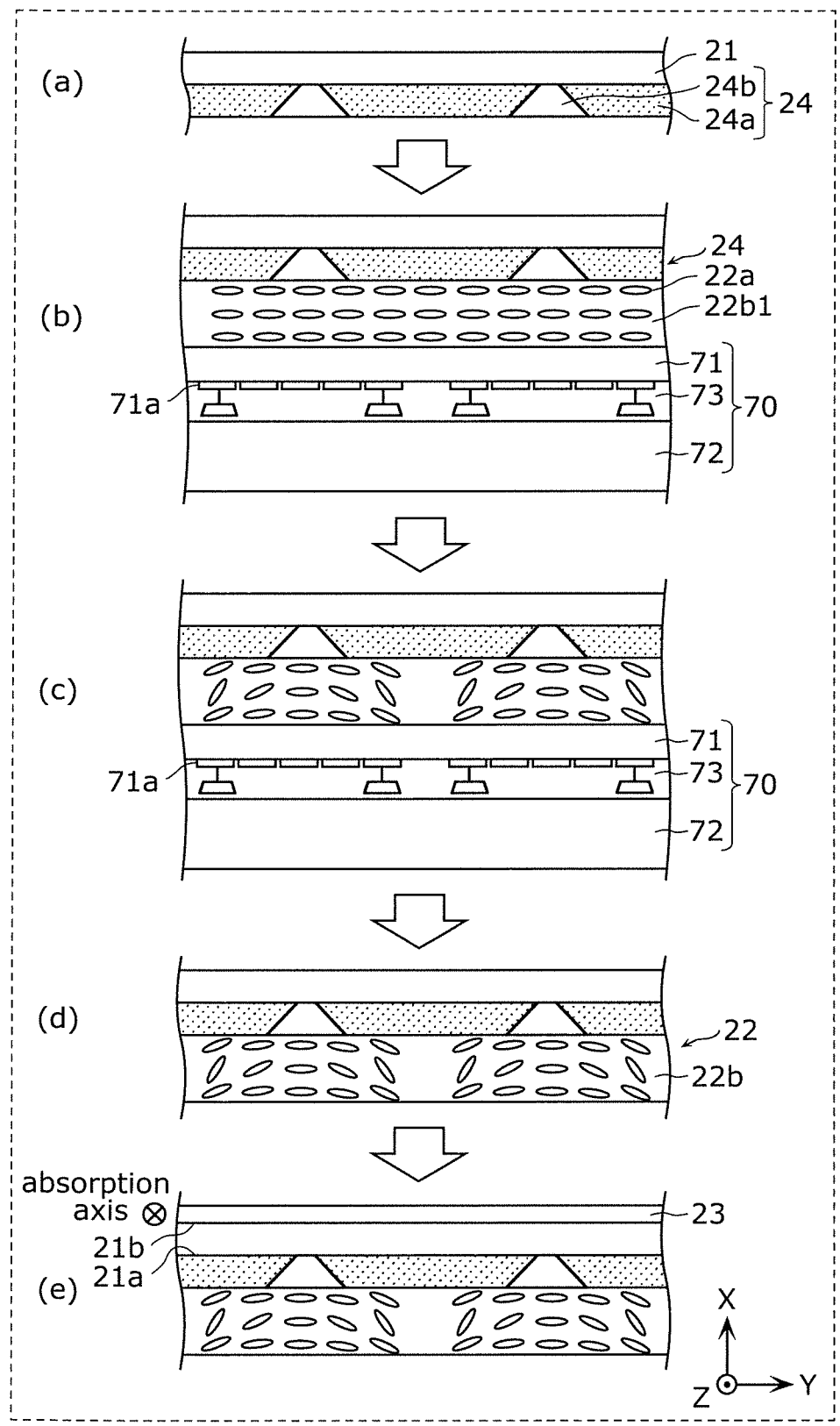
FIG. 7 is a schematic diagram illustrating the manufacture of image quality improving member according to the first exemplary embodiment.

A method for manufacturing image quality improving member 20 will be described below with reference to FIGS. 6 and 7. FIG. 6 is a flowchart manufacturing image quality improving member 20 of the first exemplary embodiment. FIG. 7 is a schematic diagram illustrating the manufacture of image quality improving member 20 of the first exemplary embodiment.

As illustrated in FIG. 6, a substrate (first transparent substrate 21) on which black matrix 24a (BM) is formed is prepared (S10). When liquid crystal display device 100 is a display device that performs the color display, first transparent substrate 21 on which black matrix 24a and color filter 24b are formed is prepared in step S10 (see part (a) of FIG. 7). The method for forming black matrix 24a and color filter 24b is not particularly limited. For example, black matrix 24a and color filter 24b are formed by printing.

The liquid crystal is sealed to form liquid crystal lens 22 (S20). For example, step S20 may be performed by a known liquid crystal sealing process such as a one drop fill (ODF) process. Specifically, as illustrated in part (b) of FIG. 7, resin material 22b1 containing liquid crystal molecules 22a is dropped onto pixel formation layer 24, and bonded to electric field substrate 70 used to apply an electric field in a vacuum state. Electric field substrate 70 includes base materials 71 and 72 and a wiring layer 73 sandwiched between base materials 71 and 72. Electrode 71a used to apply the electric field to liquid crystal molecules 22a is formed in base material 71. Although not illustrated, a counter electrode for electrode 71a is also disposed.

At this time, for example, liquid crystal molecules 22a are uniformly aligned. A frame-shaped sealing material may be formed to seal resin material 22b1.

The electric field is applied to liquid crystal molecules 22a (S30). The electric field necessary to obtain a desired light condensing characteristic is applied. Consequently, liquid crystal molecules 22a are aligned so as to obtain the desired light condensing characteristic as illustrated in part (c) of FIG. 7.

Resin material 22b1 is cured while the electric field is applied to liquid crystal molecules 22a (S40). For example, resin material 22b1 is cured by at least one of heat and light. Consequently, resin layer 22b is formed. Resin material 22b1 is cured to fix the alignment state of liquid crystal molecules 22a. When resin layer 22b is formed, electric field substrate 70 is removed. Consequently, liquid crystal lens 22 having the refractive index distribution in the Y-axis direction is formed as illustrated in part (d) of FIG. 7.

The polarizing plate is bonded to second main surface 21b on the side opposite to first main surface 21a on which pixel formation layer 24 of first transparent substrate 21 is formed (S50). Specifically, first polarizing plate 23 is bonded to second main surface 21b such that the absorption axis of first polarizing plate 23 and the distribution direction of liquid crystal lens 22 are orthogonal to each other (see part (e) of FIG. 7).

Consequently, image quality improving member 20 of the first exemplary embodiment is manufactured. Liquid crystal lens 22 of the first exemplary embodiment is a static lens in which an optical state does not change dynamically. Liquid crystal display device 100 is manufactured by bonding manufactured image quality improving member 20 and liquid crystal panel 10 with adhesive layer 30 interposed therebetween. For example, adhesive layer 30 bonds liquid crystal lens 22 and TFT substrate 11a together.

The method for manufacturing image quality improving member 20 is not limited to the above method as long as image quality improving member 20 including liquid crystal lens 22 having uniaxial anisotropy can be manufactured.

[1-4. Effects]

As described above, image quality improving member 20 of the first exemplary embodiment includes: uniaxial anisotropic liquid crystal lens 22 (an example of the optical lens) having the refractive index distribution in the Y-axis direction (an example of the first direction) orthogonal to optical axis J of collimated light L1 and collimated light L2 (an example of the incident light), liquid crystal lens 22 condensing collimated light L2 (an example of the light) vibrating in the Y-axis direction in collimated light L1 and collimated light L2; first transparent substrate 21 (an example of the first substrate) on which black matrix 24a including the plurality of openings 24a1 (an example of the first opening) through which the light output from liquid crystal lens 22 is transmitted is formed, first transparent substrate 21 having the translucency; and first polarizing plate 23 disposed on first transparent substrate 21, first polarizing plate 23 having the absorption axis in the Z-axis direction (an example of the second direction) orthogonal to the Y-axis direction as viewed from the direction of optical axis J.

Consequently, when the light vibrating in the Y-axis direction is incident on liquid crystal lens 22, liquid crystal lens 22 can condense the light by the lens effect, and output the light from first polarizing plate 23 in each direction. When the light vibrating in the direction (Z-axis direction) orthogonal to the Y-axis is incident on liquid crystal lens 22, liquid crystal lens 22 transmits the light without condensing because the lens effect is not generated. The light is absorbed by black matrix 24a. Although transmitted through opening 24a1, part of the light is absorbed by first polarizing plate 23. That is, when the light vibrating in the direction (Z-axis direction) orthogonal to the Y-axis is incident on liquid crystal lens 22, the light traveling in the oblique and front directions can be prevented from being output from first polarizing plate 23.

Consequently, for example, in the case where image quality improving member 20 is used while bonded to liquid crystal panel 10, the light in the Y-axis direction is incident on image quality improving member 20 from liquid crystal panel 10 when the liquid crystal panel performs the bright display, which allows the improvement of the viewing angle performance. The light in the Z-axis direction is incident on image quality improving member 20 from liquid crystal panel 10 when liquid crystal panel 10 performs the dark display, whereby the light can be prevented from being output in the oblique and front directions, and the contrast ratios in the oblique and front directions can be improved.

Furthermore, when image quality improving member 20 includes black matrix 24a, the external light is absorbed by black matrix 24a, so that the visibility of the image on liquid crystal panel 10 can be improved.

Thus, image quality improving member 20 is attached to liquid crystal panel 10, which allows the improvement of the image quality.

The optical lens is liquid crystal lens 22 including liquid crystal molecules 22a, and the arrangement of liquid crystal molecules 22a is fixed.

Consequently, the lens effect can be generated without applying the electric field or the like to liquid crystal lens 22. Thus, image quality improving member 20 improving the image quality can be constructed with a simple configuration.

The aperture ratio of black matrix 24a is less than or equal to 30%.

Consequently, the external light incident from the outside of image quality improving member 20 can effectively be absorbed. That is, the degradation of the image quality due to the external light can further be prevented.

Black matrix 24a is disposed on first main surface 21a of first transparent substrate 21 opposed to liquid crystal lens 22, and first polarizing plate 23 is disposed on second main surface 21b on the side opposite to first main surface 21a.

Consequently, the distance between black matrix 24a and liquid crystal lens 22 is shortened as compared with the case where black matrix 24a is disposed on first main surface 21a. Thus, in liquid crystal display device 100, the aperture ratio of black matrix 24a can be lowered while a wide range of emission angle θ is maintained.

As described above, liquid crystal display device 100 of the first exemplary embodiment includes backlight 40 that emits collimated light BL, liquid crystal panel 10 including liquid crystal layer 12 on which the collimated light is incident, and image quality improving member 20 on which collimated light L2 transmitted through liquid crystal layer 12 is incident as the incident light.

Consequently, liquid crystal display device 100 can improve the viewing angle performance by the lens effect of liquid crystal lens 22 when performing the bright display. When performing the dark display, liquid crystal display device 100 can improve the contrast ratios in the front and oblique directions because liquid crystal lens 22 does not generate the lens effect. Thus, in liquid crystal display device 100, the image quality can be improved.

Backlight 40 independently emits first light, second light, and third light having different emission colors.

Consequently, the light emitted from backlight 40 becomes narrowband light, so that the influence of the wavelength dispersion of liquid crystal molecules 22a on the display can be reduced.

First Modification of First Exemplary Embodiment

Figure 8:
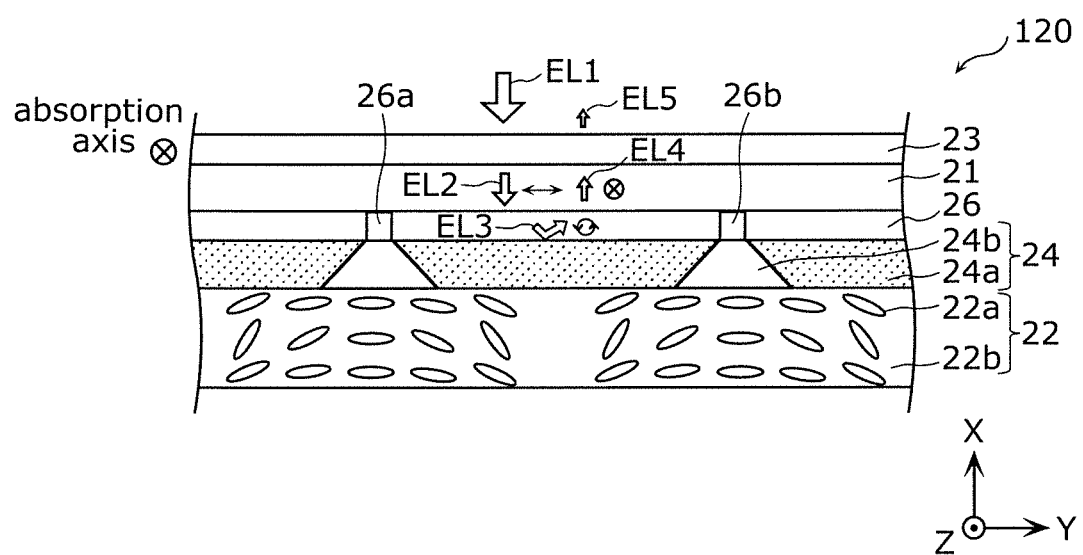
FIG. 8 is an enlarged sectional view schematically illustrating a sectional configuration of image quality improving member according to the first modification.

The image quality improving member that can further reduce the influence of the external light will be described below in first and second modifications. Image quality improving member 120 according to a first modification will be described with reference to FIG. 8. FIG. 8 is an enlarged sectional view schematically illustrating a sectional configuration of image quality improving member 120 of the first modification. The driving system of liquid crystal panel 10 is not particularly limited, but is a VA mode, a TN mode, an IPS mode, or the like.

As illustrated in FIG. 8, in addition to image quality improving member 20 of the first exemplary embodiment, image quality improving member 120 of the first modification further includes quarter-wave phase difference plate 26 between first polarizing plate 23 and pixel formation layer 24. In the first modification, quarter-wave phase difference plate 26 is disposed between first transparent substrate 21 and pixel formation layer 24.

Opening 26a corresponding to opening 24a1 is formed in quarter-wave phase difference plate 26. Specifically, the plurality of openings 26a are formed at positions overlapping the plurality of openings 24a1 formed in black matrix 24a in planar view. In other words, quarter-wave phase difference plate 26 is formed so as to cover black matrix 24a. For example, the aperture ratio of quarter-wave phase difference plate 26 is equal to the aperture ratio of black matrix 24a. For example, the aperture ratio of quarter-wave phase difference plate 26 is less than or equal to 30%.

The sectional shape of opening 26a is not particularly limited unless quarter-wave phase difference plate 26 is disposed on the path through which the collimated light is output from liquid crystal lens 22, but the sectional shape of opening 26a may be a rectangular shape or a trapezoidal shape that gradually increases from pixel formation layer 24 toward first polarizing plate 23.

Translucent resin 26b is formed in opening 26a of quarter-wave phase difference plate 26.

The case where external light EL1 is incident on image quality improving member 120 will be described. The light in the direction (in the example of FIG. 8, the Y-axis direction, also referred to as the incident polarization direction) orthogonal to the absorption axis of first polarizing plate 23 is transmitted when external light EL1 is incident on first polarizing plate 23. External light EL2 transmitted through first polarizing plate 23 is transmitted through quarter-wave phase difference plate 26 to become circularly polarized light. External light EL3 that has become the circularly polarized light is incident on black matrix 24a. At this time, part of external light EL3 is reflected without being absorbed by black matrix 24a.

Reflected external light EL3 is transmitted through quarter-wave phase difference plate 26 again, and becomes external light EL4 (linearly polarized light) in the direction (in the example of FIG. 8, the Z-axis direction, also referred to as the output polarization direction) orthogonal to the direction of the light transmitted through the first polarizing plate 23. That is, external light EL2 transmitted through first polarizing plate 23 passes through quarter-wave phase difference plate 26 twice, and becomes the light vibrating in the output polarization direction orthogonal to the incident polarization direction. Because the output polarization direction is parallel to the absorption axis of first polarizing plate 23, external light EL3 reflected without being absorbed by black matrix 24a is absorbed by first polarizing plate 23. For this reason, output light L5 output from image quality improving member 120 due to external light EL1 can be prevented.

As described above, image quality improving member 120 of the first modification further includes quarter-wave phase difference plate 26 disposed between black matrix 24a and first polarizing plate 23, the plurality of openings 26a (an example of the second opening) being formed at positions overlapping with the plurality of openings 24a1 (an example of the first opening) formed in black matrix 24a in planar view (an example as viewed from the direction of optical axis J) in quarter-wave phase difference plate 26.

Consequently, external light EL1 incident on image quality improving member 120 can be prevented from being reflected in image quality improving member 120 and emitted from image quality improving member 120. Because opening 26a is formed at a position overlapping opening 24a1 of black matrix 24a in quarter-wave phase difference plate 26, quarter-wave phase difference plate 26 does not affect the output light when performing bright display. Thus, image quality improving member 120 can further reduce the influence of external light EL1 while the image quality in the bright display is maintained.

Second Modification of First Exemplary Embodiment

Figure 9:
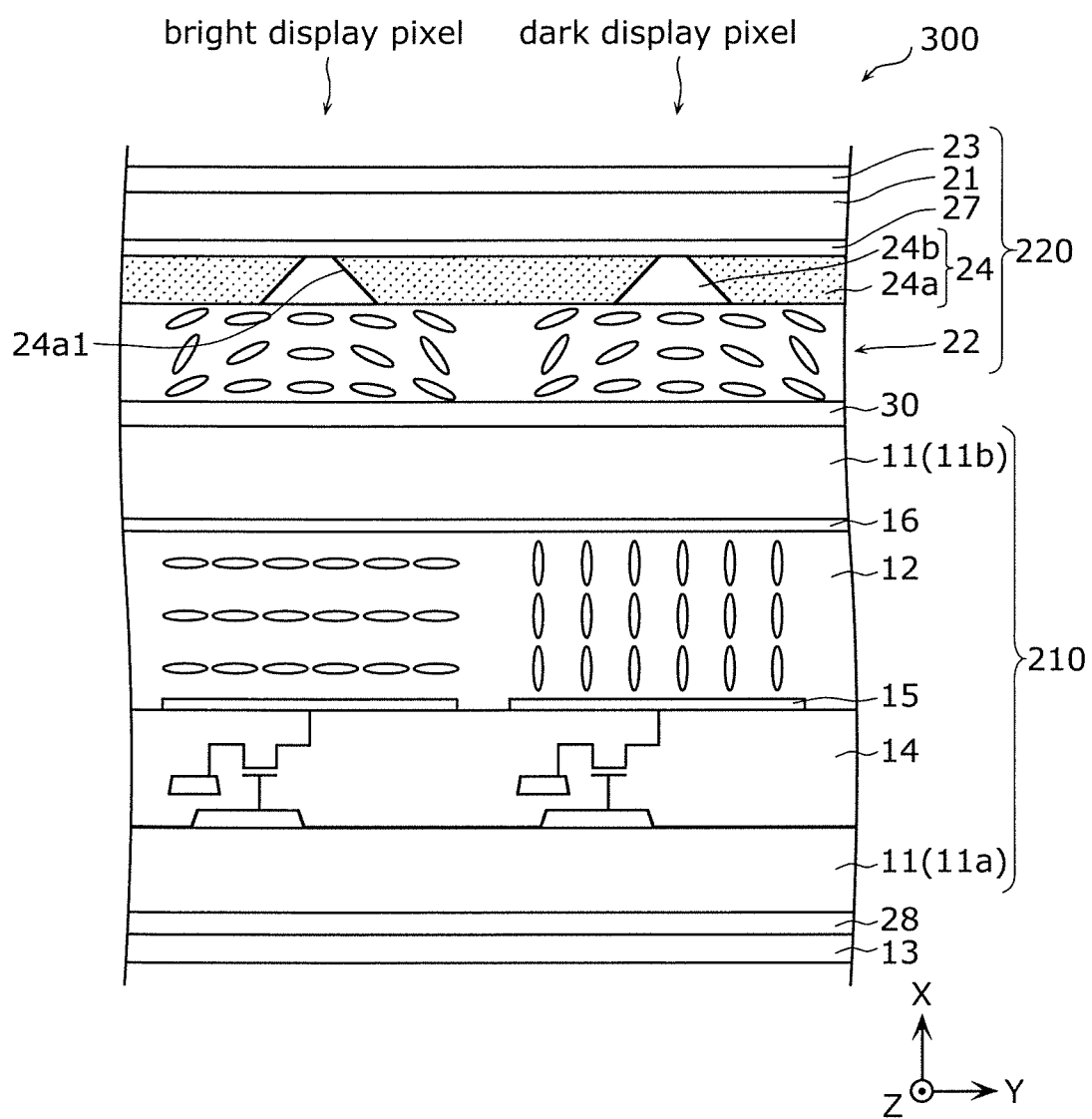
FIG. 9 is an enlarged sectional view schematically illustrating a sectional configuration of liquid crystal display device according to the second modification.

An image quality improving member according to a second modification will be described below with reference to FIG. 9. FIG. 9 is an enlarged sectional view schematically illustrating a sectional configuration of liquid crystal display device 300 including image quality improving member 220 of the second modification. The driving system of liquid crystal panel 210 is the VA mode.

As illustrated in FIG. 9, liquid crystal display device 300 of the second modification further includes quarter-wave phase difference plates 27 and 28 in addition to liquid crystal display device 100 of the first exemplary embodiment.

Image quality improving member 220 further includes quarter-wave phase difference plate 27 between first polarizing plate 23 and pixel formation layer 24 (for example, black matrix 24a). In the second modification, quarter-wave phase difference plate 27 is disposed between first transparent substrate 21 and pixel formation layer 24. Quarter-wave phase difference plate 27 is an example of the first quarter-wave phase difference plate. Quarter-wave phase difference plate 27 may be included in first polarizing plate 23.

Liquid crystal panel 210 further includes quarter-wave phase difference plate 28 between TFT substrate 11a and second polarizing plate 13. Quarter-wave phase difference plate 28 is an example of the second quarter-wave phase difference plate. Quarter-wave phase difference plate 28 may be included in second polarizing plate 13.

A slow axis of quarter-wave phase difference plate 27 and a slow axis of quarter-wave phase difference plate 28 are orthogonal to each other in planar view.

The opening is not formed in both quarter-wave phase difference plate 27 and quarter-wave phase difference plate 28. For this reason, quarter-wave phase difference plate 27 and quarter-wave phase difference plate 28 are also arranged at a position overlapping opening 24a1 in planar view. Quarter-wave phase difference plate 27 is disposed so as to cover pixel formation layer 24, namely, to cover black matrix 24a and color filter 24b (or opening 24a1).

In liquid crystal display device 300, the mechanism preventing the influence of external light is the same as the first modification.

The case where the dark display is performed in liquid crystal display device 300 will be described. The linearly polarized light transmitted through second polarizing plate 13 is transmitted through quarter-wave phase difference plate 28 to become elliptically polarized light. The elliptically polarized light is transmitted through VA-mode liquid crystal layer 12. At this point, VA-mode liquid crystal layer 12 does not have retardation in the normal direction (front direction) to liquid crystal layer 12 when performing the dark display (when the optical axis (long side direction) of liquid crystal molecules 22a is aligned parallel to the X-axis). That is, in performing the dark display, because the elliptically polarized light incident on liquid crystal layer 12 is transmitted through the space having the uniform refractive index, the elliptically polarized light is transmitted through liquid crystal layer 12 as the elliptically polarized light. The elliptically polarized light is condensed by liquid crystal lens 22, transmitted through color filter 24b, and is incident on quarter-wave phase difference plate 27. Because the slow axes of quarter-wave phase difference plate 27 and quarter-wave phase difference plate 28 are orthogonal to each other, the elliptically polarized light is transmitted through quarter-wave phase difference plate 27 to return to the linearly polarized light. The linearly polarized light transmitted through quarter-wave phase difference plate 27 is absorbed by first polarizing plate 23. Thus, liquid crystal display device 300 can prevent the influence of external light without affecting the display quality in performing the dark display.

As described above, image quality improving member 220 of the second modification further includes quarter-wave phase difference plate 27 (an example of the first quarter-wave phase difference plate) disposed between black matrix 24a and first polarizing plate 23. Liquid crystal panel 210 is the VA-mode liquid crystal panel, and further includes translucent TFT substrate 11a (an example of a second substrate) disposed between liquid crystal layer 12 and backlight 40, second polarizing plate 13 disposed on the side of backlight 40 of TFT substrate 11a, and quarter-wave phase difference plate 28 (an example of the second quarter-wave phase difference plate) disposed between TFT substrate 11a and second polarizing plate 13. The slow axis of quarter-wave phase difference plate 27 and the slow axis of quarter-wave phase difference plate 28 are orthogonal to each other in planar view (an example as viewed from the direction of optical axis J).

Consequently, for VA-mode liquid crystal panel 10, when quarter-wave phase difference plate 28 is disposed, it is not necessary to form the opening in quarter-wave phase difference plate 27, so that quarter-wave phase difference plate 27 can easily be provided. Thus, image quality improving member 220 that prevents the influence of external light while maintaining the quality of the image can easily be manufactured.

Third Modification of First Exemplary Embodiment

An image quality improving member in which wavelength dispersion of liquid crystal molecules 22a included in liquid crystal lens 22 is considered will be described below in third and fourth modifications. Due to the influence of the wavelength dispersion of liquid crystal molecules 22a, a degree of condensation of the light by liquid crystal lens 22 varies in each light wavelength. For example, when two color filters disposed adjacent to each other are filters having different colors, sometimes the emission angle (emission angle θ in FIG. 4) of the light output from the two color filters varies. For this reason, when both the two color filters are the color filters for pixels that perform the bright display, the front and the oblique directions of the liquid crystal display device are different from each other in an intensity ratio of the light output from the two color filters. Consequently, sometimes the display seems to be different when viewed from the front and oblique directions. The image quality improving member that can further improve the image quality of the liquid crystal display device by reducing such a phenomenon will be described in the third and fourth modifications. Specifically, in lens units (for example, a first lens unit and a second lens unit (to be described later)) having different colors of corresponding color filters, the focal length varies when the light having the same wavelength is incident. Details will be described below.

Figure 10:
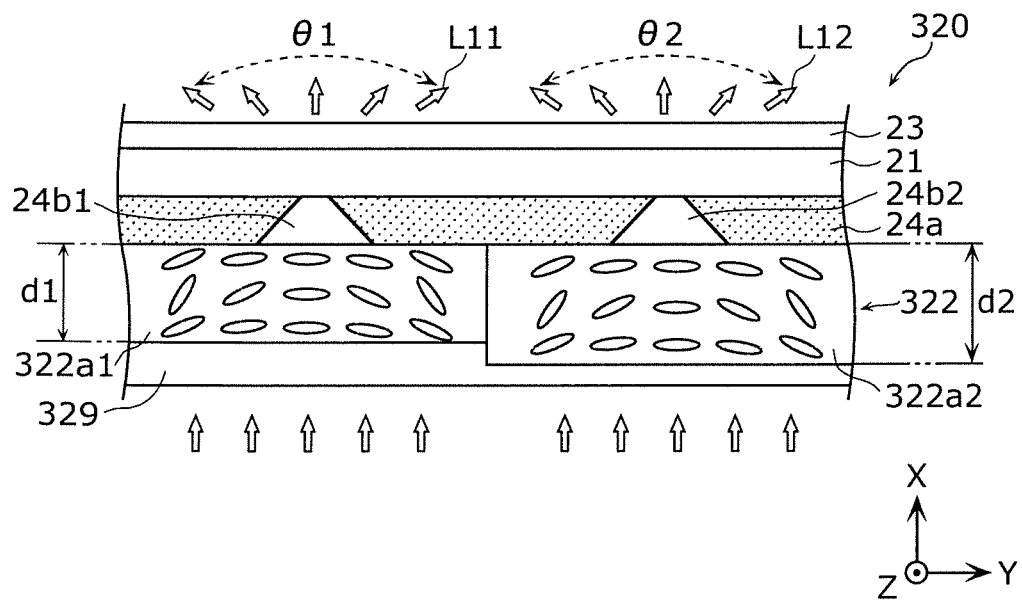
FIG. 10 is an enlarged sectional view schematically illustrating a sectional configuration of image quality improving member according to the third modification.

The image quality improving member according to the third modification will be described with reference to FIG. 10. FIG. 10 is an enlarged sectional view schematically illustrating a sectional configuration of image quality improving member 320 of the third modification. Color filter 24b1 and color filter 24b2 have different colors. Color filter 24b1 is an example of the color filter of the first color, and color filter 24b2 is an example of the color filter of the second color.

As illustrated in FIG. 10, image quality improving member 320 includes liquid crystal lens 322 instead of liquid crystal lens 22 of image quality improving member 20 according to the first exemplary embodiment. Liquid crystal lens 322 includes first lens unit 322a1 that condenses the light toward opening 24a1 in which color filter 24b1 is disposed and second lens unit 322a2 that condenses the light toward opening 24a1 in which color filter 24b2 is disposed. Image quality improving member 320 further includes planarization layer 329 on the surface (the surface on the negative X-axis side) on the side opposite to first polarizing plate 23 of liquid crystal lens 322 in addition to image quality improving member 20 of the first exemplary embodiment.

The emission range θ of the light output from each lens unit can be adjusted by the thickness of each lens unit. The emission range θ can be expanded by increasing the thickness of the lens unit. For this reason, in the third modification, the lengths (the length in the X-axis direction and the thickness) of first lens unit 322a1 and second lens unit 322a2 in the direction in which the light is transmitted are set so as to be different from each other. In the example of FIG. 10, thickness d1 of first lens unit 322a1 is set to be thinner than thickness d2 of second lens unit 322a2.

Thickness d1 and thickness d2 are set such that emission range θ1 of output light L11 output from first lens unit 322a1 and emission range θ2 of output light L12 output from second lens unit 322a2 are equal to each other.

Planarization layer 329 is provided to planarize the surface of image quality improving member 320 on the side to be bonded to liquid crystal panel 10 in order to bond image quality improving member 320 to liquid crystal panel 10. For example, planarization layer 329 is made of a resin material having translucency. When the difference between thickness d1 and thickness d2 can be absorbed by adhesive layer 30, planarization layer 329 may not be provided.

When pixel formation layer 24 includes a color filter (an example of the color filter of the third color) in which the color is different from both color filter 24b1 and color filter 24b2, the thickness of each lens unit may be set such that a lens unit (an example of the third lens unit) corresponding to the color filter, first lens unit 322a1, and second lens unit 322a2 are different from one another in the thicknesses. The thickness of the lens unit in which the color of the color filter is the same is equally formed.

For example, the surface (the surface on the positive X-axis side) of base material 71 of the electric field substrate 70 on the side contacting with resin material 22b1 in part (b) of FIG. 7 is formed into the shape corresponding to the surface on the negative X-axis side (the surface having a step) of liquid crystal lens 322, whereby liquid crystal lens 322 can be manufactured. Only by changing the shape of base material 71, liquid crystal lens 322 in FIG. 10 can be manufactured without adding a process to the flowchart in FIG. 6.

As described above, in image quality improving member 420 of the third modification, in two openings 24a1 disposed adjacent to each other among the plurality of openings 24a1 (an example of the first opening), color filter 24b1 (an example of the color filter of the first color) is disposed in one of openings 24a1, and color filter 24b2 (an example of the color filter of the second color) is disposed in the other opening 24a1. Liquid crystal lens 322 includes first lens unit 322a1 that condenses the light vibrating in the Y-axis direction (an example of the first direction) toward one of openings 24a1 and second lens unit 322a2 that condenses the light vibrating in the Y-axis direction toward the other opening 24a1, and first lens unit 322a1 and second lens unit 322a2 have different focal lengths when the light having the same wavelength is incident thereon. For example, thicknesses d1 of first lens unit 322a1 and thicknesses d2 of second lens unit 322a2 are different from each other.

Consequently, emission range θ1 of the light transmitted through first lens unit 322a1 and emission range θ2 of the light transmitted through second lens unit 322a2 can individually be adjusted to obtain the desired image quality. For example, in order to prevent the degradation of the image quality due to the influence of the wavelength dispersion of liquid crystal molecules 22a, the focal lengths of first lens unit 322a1 and second lens unit 322a2 may be determined such that emission ranges θ1 and θ2 are equal to each other. The focal length can be controlled by making thickness d1 of first lens unit 322a1 different from thickness d2 of second lens unit 322a2.

For example, when color filter 24b1 is a color filter having a color on the longer wavelength side than color filter 24b2, the focal length of first lens unit 322a1 may be shorter than the focal length of second lens unit 322a2.

Fourth Modification of First Exemplary Embodiment

Figure 11:
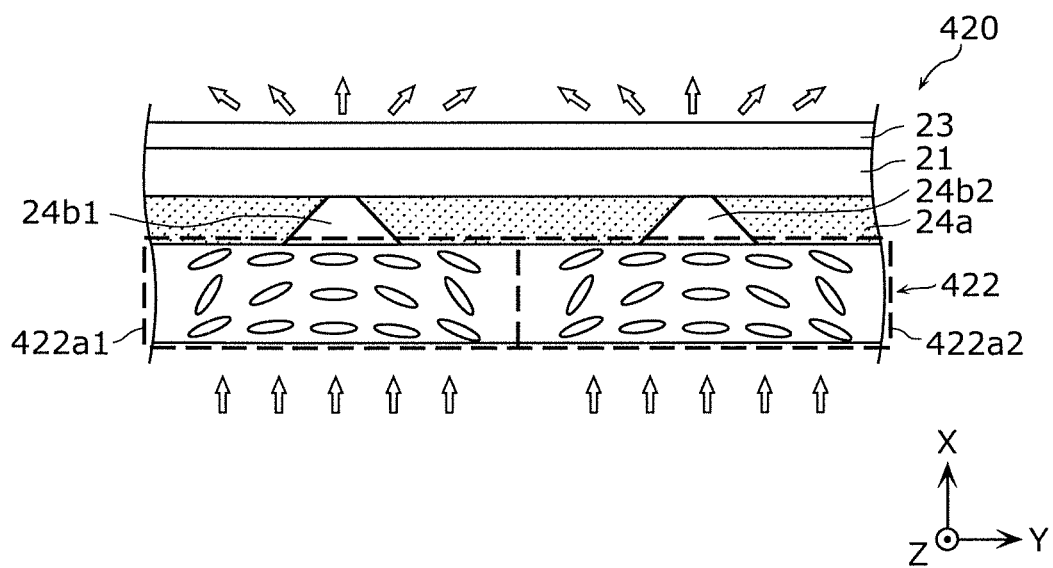
FIG. 11 is an enlarged sectional view schematically illustrating a sectional configuration of image quality improving member according to the fourth modification.

The image quality improving member according to the fourth modification will be described below with reference to FIG. 11. FIG. 11 is an enlarged sectional view schematically illustrating a sectional configuration of image quality improving member 420 of the fourth modification. Color filter 24b1 and color filter 24b2 have different colors.

As illustrated in FIG. 11, image quality improving member 420 includes liquid crystal lens 422 instead of liquid crystal lens 22 of image quality improving member 20 according to the first exemplary embodiment. Liquid crystal lens 422 includes first lens unit 422a1 and second lens unit 422a2.

Emission range θ of the light output from each lens unit can be adjusted by the alignment state of the liquid crystal of each lens unit. Specifically, emission range θ can be adjusted by changing the refractive index distribution in the liquid crystal lens. For this reason, in the fourth modification, first lens unit 422a1 and second lens unit 422a2 have different refractive index distributions. Specifically, first lens unit 422a1 and second lens unit 422a2 are different from each other in the arrangement of liquid crystal molecules 22a.

In the example of FIG. 11, the refractive index distribution of first lens unit 422a1 is smaller than the refractive index distribution of second lens unit 422a2. As used herein, the small refractive index distribution means that a difference between the maximum value and the minimum value of the refractive index of the lens unit is small.

The refractive index distribution of the lens unit having the same color of the color filter is equally formed.

For example, liquid crystal lens 422 can be manufactured by changing a gradient of the electric field applied to each lens unit in electric field substrate 70 in part (c) of FIG. 7. Only by changing the gradient of the applied electric field, liquid crystal lens 422 in FIG. 11 can be manufactured without adding a process to the flowchart in FIG. 6.

As described above, in image quality improving member 420 of the fourth modification, first lens unit 422a1 and second lens unit 422a2 are different from each other in the arrangement of liquid crystal molecules 22a.

Consequently, by varying the arrangement of liquid crystal molecules 22a, the emission range of the light transmitted through first lens unit 422a1 and the emission range of the light transmitted through second lens unit 422a2 can individually be adjusted to obtain the desired image quality. For example, in order to prevent the degradation of the image quality due to the influence of the wavelength dispersion of liquid crystal molecules 22a, the arrangement of liquid crystal molecules 22a may be determined in first lens unit 422a1 and second lens unit 422a2 such that the emission ranges are equal to each other.

In the third and fourth modifications, the influence due to the wavelength dispersion of liquid crystal molecules 22a is prevented by the adjustment of the thickness and refractive index distribution of the liquid crystal lens (that is, the adjustment of Δn×d). However, the reduction of the influence due to the wavelength dispersion of liquid crystal molecules 22a may be achieved by other means. For example, as described in the first exemplary embodiment, the reduction of the influence due to the wavelength dispersion of liquid crystal molecules 22a may be achieved by forming the collimated light emitted from backlight 40 into the narrowband light.

SECOND EXEMPLARY EMBODIMENT

Figure 12:
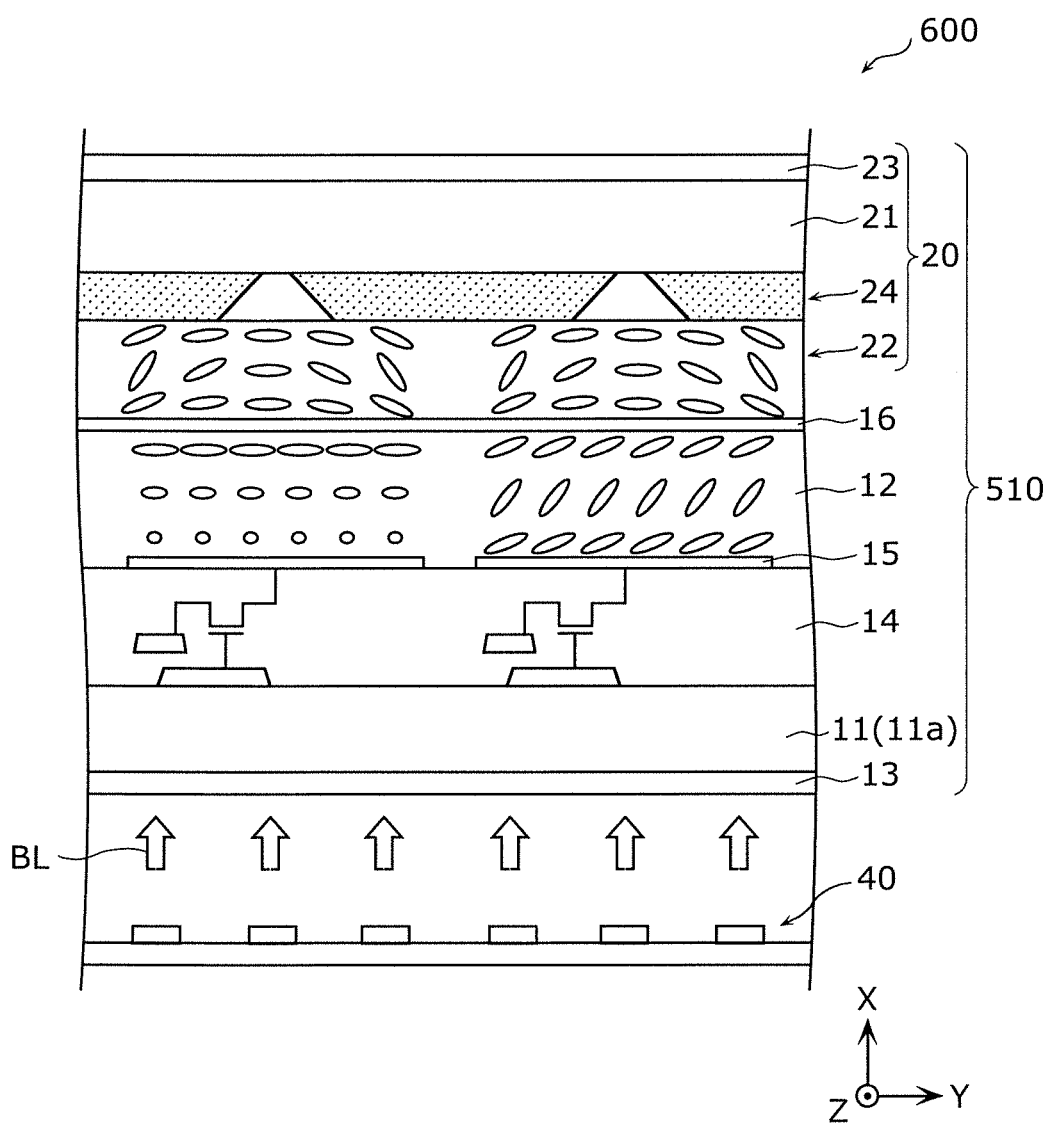
FIG. 12 is an enlarged sectional view schematically illustrating a sectional configuration of liquid crystal display device according to the second exemplary embodiment.

Liquid crystal display device according to a second exemplary embodiment will be described below with reference to FIG. 12. FIG. 12 is an enlarged sectional view schematically illustrating a sectional configuration of liquid crystal display device 600 of the second exemplary embodiment.

As illustrated in FIG. 12, liquid crystal display device 600 includes liquid crystal panel 510 and backlight 40. Liquid crystal panel 510 includes second transparent substrate 11, liquid crystal layer 12, second polarizing plate 13, and image quality improving member 20. That is, liquid crystal panel 510 may be configured while including image quality improving member 20. FIG. 12 illustrates an example in which liquid crystal display device 600 includes image quality improving member 20 of the first exemplary embodiment. Alternatively, liquid crystal display device 600 may include the image quality improving member of each modification.

Accordingly, adhesive layer 30 and counter substrate 11b included in liquid crystal display device 100 of the first exemplary embodiment can be omitted, so that liquid crystal display device 600 can be thinned.

OTHER EXEMPLARY EMBODIMENTS

Although the image quality improving members and the liquid crystal display devices of each exemplary embodiment and modification (hereinafter, also referred to as the exemplary embodiments and the like) are described above, the present disclosure is not limited to the exemplary embodiments.

For example, the relationship among the directions in the exemplary embodiments and the like is an example. For example, the first polarizing plate, the second polarizing plate, the distribution direction, and the like may appropriately be determined according to the driving system and the like of the liquid crystal panel.

In the exemplary embodiments and the like, by way of example, the sectional shape of the opening is the trapezoid shape. However, the present disclosure is not limited to the exemplary embodiments. Alternatively, the sectional shape of the opening may be a rectangular shape or other shapes. However, from the viewpoint of reducing the influence of the external light, the opening is preferably formed in the trapezoidal shape in which the opening area gradually decreases from the liquid crystal lens toward the first transparent substrate.

In the exemplary embodiments, by way of example, each substrate is a glass substrate. However, the present disclosure is not limited to the exemplary embodiments. Each substrate may be a film substrate. Each substrate may have flexibility. In this case, the resin layer constituting the liquid crystal lens may be made of a flexible resin material.

In the exemplary embodiment, by way of example, the liquid crystal lens has the configuration in which the liquid crystal molecules are disposed in the cured resin layer. However, the present disclosure is not limited to the exemplary embodiments. For example, the liquid crystal lens may have a configuration in which the alignment state of the liquid crystal molecules can be changed depending on voltage. In this case, the liquid crystal lens is controlled to an alignment state in FIG. 4 when the liquid crystal display device displays the image. The alignment state of the liquid crystal molecules is not changed while the liquid crystal display device displays the image.

In the exemplary embodiments, by way of example, the liquid crystal display device includes one liquid crystal panel. However, the present disclosure is not limited to the exemplary embodiments. The liquid crystal display device may be a display device that is configured by overlapping a plurality of liquid crystal panels and displays one image using the plurality of liquid crystal panels. That is, the image quality improving member can also be applied to the liquid crystal display device including the liquid crystal panel unit in which the plurality of liquid crystal panels are disposed while overlapping each other.

The order of the plurality of processes described in the exemplary embodiments and the like is an example. The order of the plurality of processes may be changed, or the plurality of processes may be performed in parallel.

An embodiment obtained by various modifications of the exemplary embodiments and the like conceived by those skilled in the art or an embodiment implemented by arbitrarily combining the components and functions in each exemplary embodiment without departing from the scope of the present disclosure is also included in the present disclosure.

What is claimed is:

1. An image quality improving member comprising:
a uniaxial anisotropic optical lens having a refractive index distribution in a first direction orthogonal to an optical axis of incident light, the optical lens condensing light vibrating in the first direction in the incident light;

a translucent first substrate in which a black matrix including a plurality of first openings transmitting light output from the optical lens is formed; and a first polarizing plate disposed on the first substrate, the first polarizing plate having an absorption axis in a second direction orthogonal to the first direction when viewed from a direction of the optical axis.

2. The image quality improving member according to claim 1, wherein the optical lens is a liquid crystal lens including liquid crystal molecules, and
arrangement of the liquid crystal molecules is fixed.

3. The image quality improving member according to claim 1, wherein an aperture ratio of the black matrix is less than or equal to 30%.

4. The image quality improving member according to claim 1, wherein
in two first openings disposed adjacent to each other among the plurality of first openings,
a color filter of a first color is disposed in one of the two first openings, and
a color filter of a second color different from the first color is disposed in the other first opening,
the optical lens includes a first lens unit that condenses light vibrating in the first direction toward the one of the two first openings and a second lens unit that condenses light vibrating in the first direction toward the other first opening, and
the first lens unit and the second lens unit have different focal lengths when light having an identical wavelength is incident.

5. The image quality improving member according to claim 4, wherein the first lens unit and the second lens unit are different from each other in a thicknesses.

6. The image quality improving member according to claim 4, wherein the first lens unit and the second lens unit are different from each other in the arrangement of the liquid crystal molecule.

7. The image quality improving member according to claim 1, wherein
the black matrix is disposed on a first main surface of the first substrate opposed to the optical lens, and
the first polarizing plate is disposed on a second main surface on a side opposite to the first main surface.

8. A liquid crystal display device comprising:
a backlight that emits collimated light;
a liquid crystal panel including a liquid crystal layer on which the collimated light is incident; and
the image quality improving member according to claim 1 on which the collimated light transmitted through the liquid crystal layer is incident as the incident light.

9. The liquid crystal display device according to claim 8, wherein the image quality improving member further includes a quarter-wave phase difference plate in which a plurality of second openings are formed at positions overlapping the plurality of first openings formed in the black matrix when viewed from the direction of the optical axis, the quarter-wave phase difference plate being disposed between the black matrix and the first polarizing plate.

10. The liquid crystal display device according to claim 8, wherein
the image quality improving member further includes a first quarter-wave phase difference plate disposed between the black matrix and the first polarizing plate,
the liquid crystal panel is a Vertical Alignment (VA)-mode liquid crystal panel, and includes a translucent second substrate disposed between the liquid crystal layer and the backlight, a second polarizing plate disposed on a side of the backlight of the second substrate, and a second quarter-wave phase difference plate disposed between the second substrate and the second polarizing plate, and
a slow axis of the first quarter-wave phase difference plate and a slow axis of the second quarter-wave phase difference plate are orthogonal to each other when viewed from the direction of the optical axis.

11. The liquid crystal display device according to claim 8, wherein the backlight independently emits first light, second light, and third light having different emission colors.

* * * * *